United States Patent [19]

Gosger et al.

[11] 4,116,799

[45] Sep. 26, 1978

[54] MACHINE FOR THE SIMULTANEOUS ELECTROCHEMICAL PROCESSING OF MULTIPLE WORKPIECES

[75] Inventors: Peter Gosger, Solingen, Burg; Paul Gerhard Pott, Wermelskirchen; Bernd Wolter, Remscheid, all of Germany

[73] Assignee: AEG-Elotherm, G.m.b.H., Remscheid-Hasten, Germany

[21] Appl. No.: 720,643

[22] Filed: Sep. 7, 1976

[30] Foreign Application Priority Data

Sep. 13, 1975 [DE] Fed. Rep. of Germany ....... 2540998

[51] Int. Cl.$^2$ ............................. B23P 1/04; B23P 1/14
[52] U.S. Cl. ............................ 204/224 M; 204/297 R
[58] Field of Search .......... 204/224 M, 297 R, 224 R, 204/297 W

[56] References Cited

U.S. PATENT DOCUMENTS

| 2,721,839 | 10/1955 | Taylor | 204/297 W X |
|---|---|---|---|
| 3,043,767 | 7/1962 | Tobey | 204/297 W |
| 3,332,869 | 7/1967 | Bent et al. | 204/297 W X |
| 3,547,797 | 12/1970 | Haggerty | 204/224 M |
| 3,548,684 | 4/1972 | Sickels | 204/224 M X |
| 3,664,947 | 5/1972 | Bass | 204/224 M X |
| 3,705,843 | 12/1972 | Sickels | 204/297 R X |
| 3,746,632 | 7/1973 | Kuhdorf et al. | 204/224 M |
| 3,752,755 | 8/1973 | Krafft | 204/297 R |

Primary Examiner—John H. Mack
Assistant Examiner—D. R. Valentine
Attorney, Agent, or Firm—Cushman, Darby & Cushman

[57] ABSTRACT

A machine for simultaneously electrochemical processing a plurality of workpieces in which a workpiece receiver is mounted on spring loaded rails between a clamping unit and a base for horizontal movement between loading and operating positions. A working electrode extends through a bore in the clamping unit to create a working gap with a workpiece which is electrically connected via a spring loaded contact member to a source of eroding current. The clamping unit can be moved up and down to make and break electrical contact and to clamp and release the workpieces. Electrolyte is supplied to and removed from the working gap.

4 Claims, 2 Drawing Figures

MACHINE FOR THE SIMULTANEOUS ELECTROCHEMICAL PROCESSING OF MULTIPLE WORKPIECES

The invention relates to a machine for simultaneous electrochemical processing several electrically conductive workpieces having a receiver for eletrically insulated mounting of each workpiece with means disposed on the receiver for connection of the workpieces with one pole of D.C. current source and a processing electrode adjustable vis-a-vis the surface of the workpiece and connectable with the other pole of the D.C. current source and disposed next to the receiver, the electrically active surfaces of which, opposing the surface of the workpiece define a processing gap with supply and discharge lines for supply and discharge of liquid electrolyte to and from the operating gaps.

Machines of this type have been known for simultaneous processing of several workpieces used in turbines. The workpiece receiver of these machines is fixed in the machine and has several bearings for mounting the individual workpieces, whereby the workpieces are mounted in separate devices which each serve as a receiver for an individual workpiece and which are disposed removably in the actual workpiece receiver. The workpieces that are to be processed are first mounted in the separately provided individual receivers and then are prepared for processing in the machine by pushing the individual receivers into the overall receiver of the machine. The exchange of the individual workpieces between two processing operations, therefore, is easily possible whenever the receivers can easily be aligned in the overall receiver which is fixed in the machine.

However, the costs of such machines are considerable since a separate individual receiver has to be provided for each workpiece and separate aligning means has to be provided for the individual receivers.

Starting out from known machines of the construction described in more detail above, the invention improves the economy of this operation so that several workpieces can be inserted simultaneously and jointly into the machine for joint processing. Corresponding to the invention, a machine of the construction described in more detail above is proposed in that the receiver for the workpieces is developed as an independent construction unit for the simultaneous reception of several workpieces, and that it is disposed releasably and exchangeably in the machine.

With this construction a larger number of workpieces or of workpiece blanks can be processed jointly in one workpiece receiver and can be inserted jointly into the pertinent mounting of the machine. By exchanging the workpiece receiver after the processing operation, it is possible at the same time to increase the capacity of the machine and to organize the insertion of the workpieces into the receiver outside of the machine. Automatic equipment for loading the workpieces can be easily developed. Machine supply of the workpieces or workpiece blanks that are to be processed into the processing position of the machine is possible by insertion of a standardized receiver for workpieces into a processing position.

The attached drawings illustrate one embodiment of the invention in which.

Figure 1:
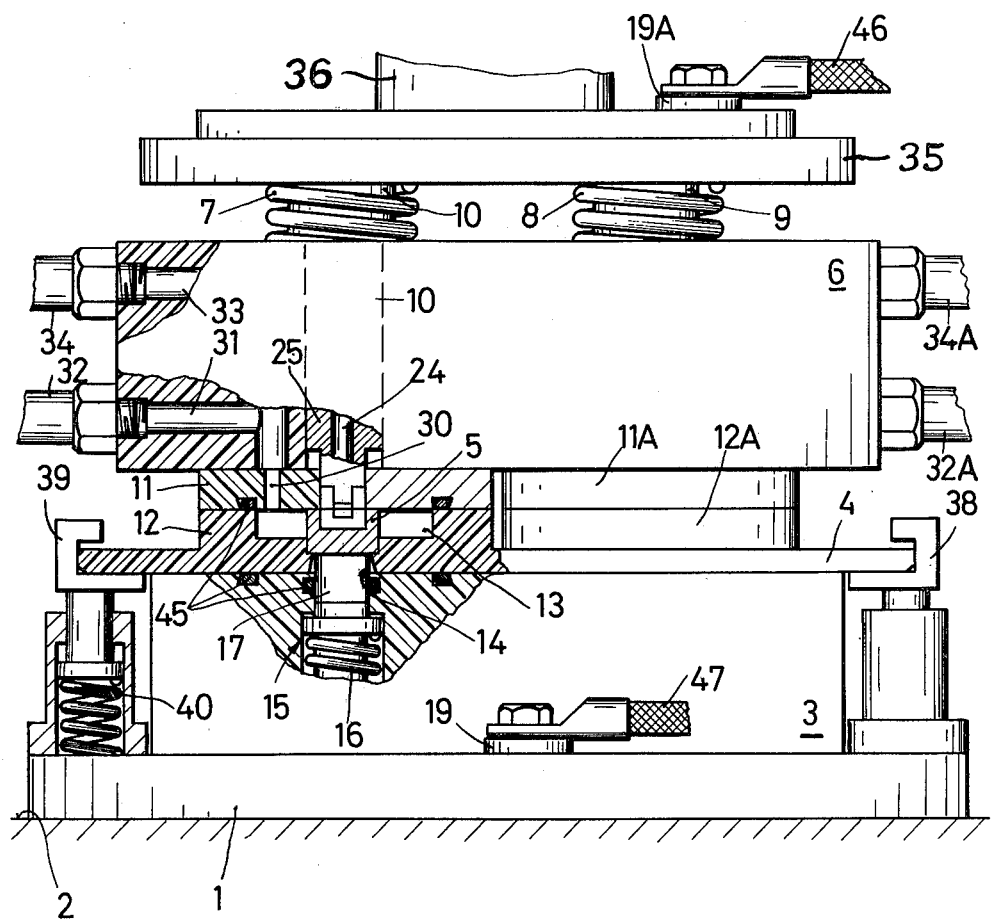
FIG. 1 shows, partially in overview and partially in section, one embodiment of the machine according to the invention with the pertinent processing electrode and the workpiece that is to be processed.

In FIG. 1, a base plate 1 made of insulating material is mounted on a machine frame 2 which in turn mounts a second insulating base plate 3. A plate-shaped workpiece receiver 4 is releasably mounted on base plate 3 and consists of insulating material, which receiver 4 mounts several workpieces that are to be processed. In FIG. 1, one workpiece 5 that is to be processed is shown in section. A clamping unit 6 is urged down by helical springs 7 and 8 which are mounted shiftably on two guides 9 and 10 which penetrate corresponding clearances in the construction element 6. Element 6 can be pressed by the action of force of the springs 7 and 8 and by means of a cylindrical attachment 11, likewise made of insulating material, against a cylindrical extension 12 of workpiece receiver 4, so that the mutually facing front surfaces of both construction elements come into firm contact with one another.

Extension 12 has a cylindrical recess 13 with a concentric bore 14. The bore 14 penetrates workpiecce receiver 4 and serves, together with a recess facing the attachment 11, for receiving workpiece 5.

Figure 2:
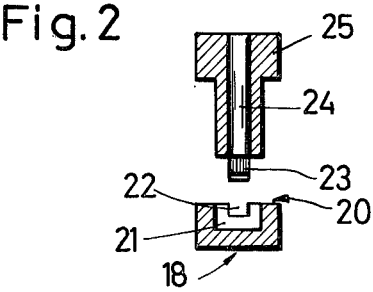
FIG. 2 shows a detail of the arrangement of FIG. 1.

In base plate 3 a compression spring 16 is mounted in a recess 15 which presses a metallic contact element 17 firmly against the bottom 18 (see FIG. 2) of the workpiece 5. Contact element 17 is electrically and conductively connected by way of electric supply lines (not shown) with an electric terminal 19 of the apparatus which is disposed on base plate 3. The attachment 11 of clamping element 6 presses with its surface facing the extension 12 firmly on the edge 20 of the workpiec3 5 and thus presses the latter firmly onto its seat in bore 14.

The illustrated workpiece 5, is a cylindrical workpiece made of electrically conductive working material and is provided with a cylindrical recess 21. In the machining operation of the illustrated embodiment, the edge 20 of workpiece 5 is to be provided with a groove 22 at two places mutually displaced by 180°, which groove is to be produced by electrochemical sinking in of a corresponding processing electrode 23. For that purpose operating electrode 23 is attached to guide bar 10 via an intermediate piece 25 provided with a bore 24. Recess 13 of extension 12 which encircles the workpiece 5 annularly is connected with a flexible hose connection 32 via a recess 30 penetrating attachment 11 and bore 31 running in the clamping element 6 which is connected with the pressure cap of a pump apparatus to supply a liquid electrolyte to recess 13. From there, the electrolyte reaches the inside of recess 21 via edge 20 of workpiece 5, and from there by way of a recess (not shown) in processing electrode 23 it reaches bore 24, and from there by way of parts of a bore located in the bore 10, it arrives in the bore 33 running in clamping element 6 which, analogously to bore 31, is in connection with the flexible connecting hose 34. The electrolyte fed in via the feed line 32 arrives back into a supply tank via line 34, from which tank it is again fed in a manner known per se, possibly after cleaning, to the operating gap formed between workpiece 5 and operating electrode 23. The outside surface of intermediate piece 25 is preferably covered with a coating of electrically non-conductive material so that only those parts of the operating electrode 23 which are in connection with the electrically conductive body of the holding part 25 have an electrically conductive surface.

Electrically connecting guide bars 9 and 10 are therefore in electrically conductive contact on the one hand with processing electrode 23 and on the other hand with a second terminal 19A of the apparatus via electric supply lines (not shown). Thus, a machining current path is created.

Guide bars 9 and 10 are attached rigidly on a mounting part 35 which is made partially of insulating material and which is connected with a driving rod 36 which will lift part 35, guide bars 9 and 10 attached to it, clamping element 6 with the attachment 11 and the processing electrode 23 sliding on the guide bars 9 and 10, e.g., via a pnuematic servo motor from the extension 12 of receiver 4. Thus, receiver 4, together with the workpiece 5 that is to be processed, can be pulled out from the machine perpendicularly to the plane of presentation from guides provided with a guide slit and engaging with receiver 4 on both sides. In order to facilitate the removal of the receiver 4 from the machine, guide rails 38 and 39 are mounted counter to the force of a spring, e.g. 40, adjustable as to height, so that upon lifting clamping element 6 off receiver 4, receiver 4 can be pulled out through the action of force of the springs, e.g., spring 40, from the base plate 3 and can be pulled out of the slits of the guide rails 38 and 39. In order to seal the operating gap between workpiece 5 and electrode 23, rubber packings 45 have been provided which seal the path of flow of the liquid electrolyte between the attachments 11 and 12 of receiver 4 and the base plate 3 and in the bore 14.

Furthermore, receiver 4 is utilized for mounting a second workpiece which is to be simultaneously processed. The corresponding arrangement of mounting the second workpiece which has been designated with 11A or 12A and 32A and 34A in the drawings designate the pertinent flexible connecting hoses for the supply and discharge of liquid electrolyte into the operating gap of this second arrangement. This second arrangement is preferably identical to the one shown in section. The processing electrodes 23 and the workpiece 5 that is to be processed can be attached to the pertinent poles of a DC current source by way of connecting lines 46 and 47.

The arrangement described operates as follows. Starting out from the positions of the elements shown in FIG. 1, clamping element 6 is lifted by way of the driving rod 36 from receiver 4, as a result of which and because of the action of force of the springs 40, receiver 4 is lifted from the base plate 3 and the contact between contact element 45 and workpiece 5 is interrupted. The receiver 4 can now be pulled out from the slit-shaped support rails 38 and 39. The reciever 4 is then —possibly with the help of machine aids — armed with the workpieces 5 that are to be processed and is again inserted into the support guide rails 38 and 39, whereupon the attachments 11 and 11A are brought into contact with receiver 4 by lowering clamping element 6. At the same time, the feed and discharge lines for the liquid electrolyte are sealed by way of rubber packings 45 and the D.C. current source is turned on. In this state, electric D.C. current flows via the operating gap between workpiece 5 and electrode 23 to cause electrolytic erosion of metal in the area of groove 22. The shape of the processing electrode 23 is sunk into the edge 20 of workpiece 5, whereupon the flow of current via the operating gap is interrupted and clamping element 6 can be lifted again off receiver 4 by way of the draw rod 36. Receiver 4 can then be removed from the machine and recharged with workpieces that are to be processed.

The invention as described has the advantage that the processing capacity of the processing machine can be increased considerably. For that purpose, it is possible to develop the installation with a receiver for workpieces for mounting a larger number of workpieces that are to be processed, whereby in the case of a corresponding multiplication of the processing electrodes, the processing capacity is increased considerably. At the same time, the workpiece receiver is exchangeable in the machine for another receiver for workpieces, so that - possibly by an automatic machine exchange of the receiver for workpieces - even the standstill times of the machine can be shortened.

Many changes and modifications in the above described embodiment of the invention can, of course, be carried out without departing from the scope of the invention. Accordingly, that scope is intended to be limited only by the scope of the appended claims.

What is claimed is:

1. A machine for simultaneously electrochemically machining a plurality of workpieces comprising;
   a workpiece receiver for mounting a plurality of workpieces;
   a plurality of working electrodes;
   guide rail means mounted on said support base, for removably mounting said receiver, to permit horizontal movement thereof between a loading and a processing position, said guide rail means accurately positioning said workpieces with respect to said electrodes for machining;
   a clamping element for holding said workpieces between said support base and said clamping element;
   means for vertically moving said clamping element to clamp and release, respectively, said receiver;
   means for defining a working gap between each electrode and workpiece;
   means for supplying electrolyte to and removing electrolyte from said gaps; and
   means for connecting a source of eroding current to said electrodes and workpieces.

2. A machine for simultaneously electrochemically processing a plurality of workpieces comprising:
   a workpiece receiver for mounting a plurality of workpieces;
   a support base;
   first and second guide rails, mounted on said support base for engaging said receiver, to permit horizontal movement thereof;
   a clamping element for holding said workpieces between said support base and said clamping element;
   means for vertically moving said clamping element to clamp and release, respectively, said receiver;
   a contact member extending for limited vertical movement in a bore in said support base to electrically contact said workpiece;
   first spring means engaging and urging said rails upward to break the contact between said contact member and said workpiece when said clamping element is lifted;
   a plurality of working electrodes;
   means for defining a working gap between each electrode and workpiece;
   means for supplying electrolyte to and removing electrolyte from said gap; and
   means for connecting a source of eroding current to said electrodes and workpieces.

3. A machine as in claim 1, wherein said electrode is connected to a mounting part and extends through a bore in said clamping element, means for lifting said mounting part and spring means between said mounting part and said clamping unit.

4. A machine as in claim 1, including means for sealing said gap.

* * * * *